United States Patent [19]

Kubo

[11] Patent Number: 5,219,412
[45] Date of Patent: Jun. 15, 1993

[54] METHOD AND APPARATUS OF MOVING BOWLING-LANE MAINTENANCE MACHINE

[75] Inventor: Chikanari Kubo, Sagamihara, Japan

[73] Assignee: Eishen Technology Co., Ltd., Japan

[21] Appl. No.: 704,792

[22] Filed: May 23, 1991

[30] Foreign Application Priority Data

Nov. 22, 1990 [JP] Japan .................................. 2-320447

[51] Int. Cl.[5] ..................... B60K 17/354; A47L 11/14
[52] U.S. Cl. ...................................... 180/246; 180/22; 180/8.6; 180/238; 15/98; 15/49.1; 51/174
[58] Field of Search ............. 180/21, 22, 24.02, 24.03, 180/24.04, 246, 24.06, 24.07, 86, 238; 15/98, 49.1, 302, 320; 364/140; 51/174

[56] References Cited

U.S. PATENT DOCUMENTS

| | | | |
|---|---|---|---|
| 3,216,037 | 11/1965 | Stevens et al. | 15/98 |
| 3,837,028 | 9/1974 | Bridge | 15/98 X |
| 4,727,615 | 3/1988 | Kubo | 15/98 |
| 4,937,911 | 7/1990 | Picchietti, Sr. et al. | 15/320 |

FOREIGN PATENT DOCUMENTS 0841921  6/1981  U.S.S.R. ................................ 51/174

Primary Examiner—David M. Mitchell
Assistant Examiner—Florian Zeender
Attorney, Agent, or Firm—Andrus, Sceales, Starke & Sawall

[57] ABSTRACT

The present invention provides a bowling-lane maintenance machine having a driving mechanism which includes four turnable drive units and four lift cylinders. Each of the drive units includes a lane running wheel, a ride-on-approach and transverse running wheel having a diameter larger than that of the lane running wheel, and a drive motor operatively connected with the wheels. When the bowling-lane maintenance machine is moved on the approach by the rotation of the ride-on-approach and transverse running wheels, the lane running wheels will not be brought into contact with the surface of the approach. When the bowling-lane maintenance machine is lifted under the actuation of the lift cylinders, the drive units may be turned to change the direction of movement in which the machine is to be moved. During movement on the approach, furthermore, the bowling-lane maintenance machine may be finely turned by adjusting the drive motors connected with the lane running wheel and/or the ride-on-approach and transverse running wheel.

2 Claims, 7 Drawing Sheets

METHOD AND APPARATUS OF MOVING BOWLING-LANE MAINTENANCE MACHINE

BACKGROUND OF THE INVENTION

1. Field of the Invention

The present invention relates to a method and apparatus of moving a bowling-lane maintenance machine.

2. Description of the Related Art

In order to play a bowling game comfortably, the bowling lanes must be always conditioned by cleaning and oiling them. The conditioning oil should not be applied to the approach. There is known a maintenance machine for performing such a cleaning and oiling operation. The maintenance machine requires a specifically designed mechanism for moving it along both the lanes and the approach extending perpendicular to the lanes.

Such a moving mechanism is exemplified in FIG. 9. The moving mechanism comprises four lane running wheels 26 at the bottom of a bowling-lane maintenance machine, which permit the machine to run along a lane for maintenance. The moving mechanism also comprises four ride-on-approach wheels 25 and four approach running wheels 28. Each of the approach running wheels 28 is operatively connected with a lift cylinder 27 which serves to lift the body of the bowling-lane maintenance machine. Thus, the machine can be moved to the next lane on the approach when it is lifted by the lift cylinders 27. Since the ride-on-approach wheels 25 are of a diameter larger than that of the lane running wheels 26, the latter will not be brought into contact with the approach when the machine is moved transversely on the approach. Once the lift cylinders 27 are contracted to ride the maintenance machine on the approach, however, it becomes difficult to control the machine with respect to its direction of movement.

Since all the wheels are driven only by a single motor 29 in addition to rotation of buffing roller means, the bowling-lane maintenance machine is complicated in its entire structure and particularly in transmission of power. This is disadvantageous in assembly, maintenance, space utilization and manufacturing cost.

It is therefore an object of the present invention to provide an improved method of the bowling-lane maintenance machine, which can facilitate to shift the bowling-lane maintenance machine from the longitudinal running mode to the transverse running mode and also to control the bowling-lane maintenance machine in its direction of movement on the approach without application of the conditioning oil onto the approach.

another object of the present invention is to provide an apparatus for performing the above-mentioned method with a simplified driving mechanism.

SUMMARY OF THE INVENTION

To this end, the present invention provides an improved method of moving a bowling-lane maintenance machine, comprising the steps of providing a plurality of drive units on the body of the bowling-lane maintenance machine, each drive unit including a lane running wheel on the body of the bowling-lane maintenance machine, a ride-on-approach and transversely running wheel on the body of said bowling-lane maintenance machine and having a diameter larger than that of said lane running wheel, means for turning these wheels, means for determining the angle of turn and means for driving the wheels; lifting the bowling-lane maintenance machine by lifting means on said machine body; turning said drive units through an angle of 90 degrees±alpha to change the machine in its direction of movement; fine-adjusting the direction of movement of the maintenance machine by said turning means while maintaining said angle of turn in the range of 90 degrees±alpha; and controlling the maintenance machine in its direction of movement by regulating the rotation of the respective drive means during the running of the machine.

The present invention also provides an appraratus of moving a bowling-lane maintenance machine, comprising a plurality of drive units on the body of the bowling-lane maintenance machine, each drive unit including a lane running wheel on the body of the bowling-lane maintenance machine, a ride-on-approach and transversely running wheel on said maintenance machine and having a diameter larger than that of said lane running wheel, means for turning these wheels, angle determining means for maintaining the angle of turn within a range of 90 degrees±alpha and means for driving the wheels, and lifting means located on said maintenance machine and connected with said drive units.

DETAILED DESCRIPTION OF PREFERRED EMBODIMENT

Figure 1:
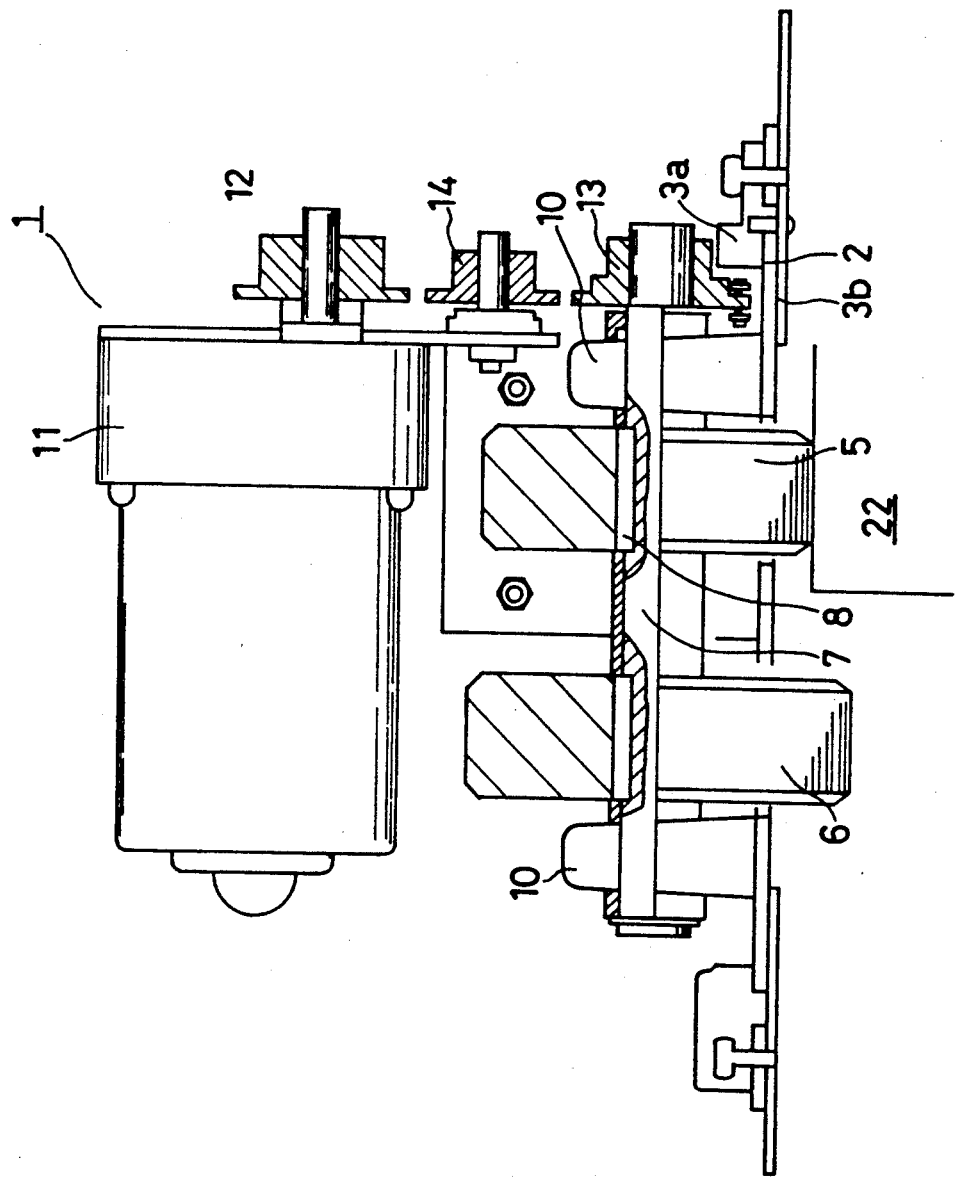
FIG. 1 is a front view of a drive unit constructed in accordance with the present invention.

Referring to the drawings and particularly to FIG. 1, there is shown a drive unit 1 constructed according to the present invention and mounted on a bowling-lane maintenance machine through rotary guides 3a and 3b. The drive unit 1 comprises a rotary plate 2 rotatably mounted on the body of the bowling-lane maintenance machine through roller 9 (see FIG. 2). Thus, the rotary plate 2 may be guided by the rotary guides 3a and 3b and rotatably driven without less friction.

Figure 2:
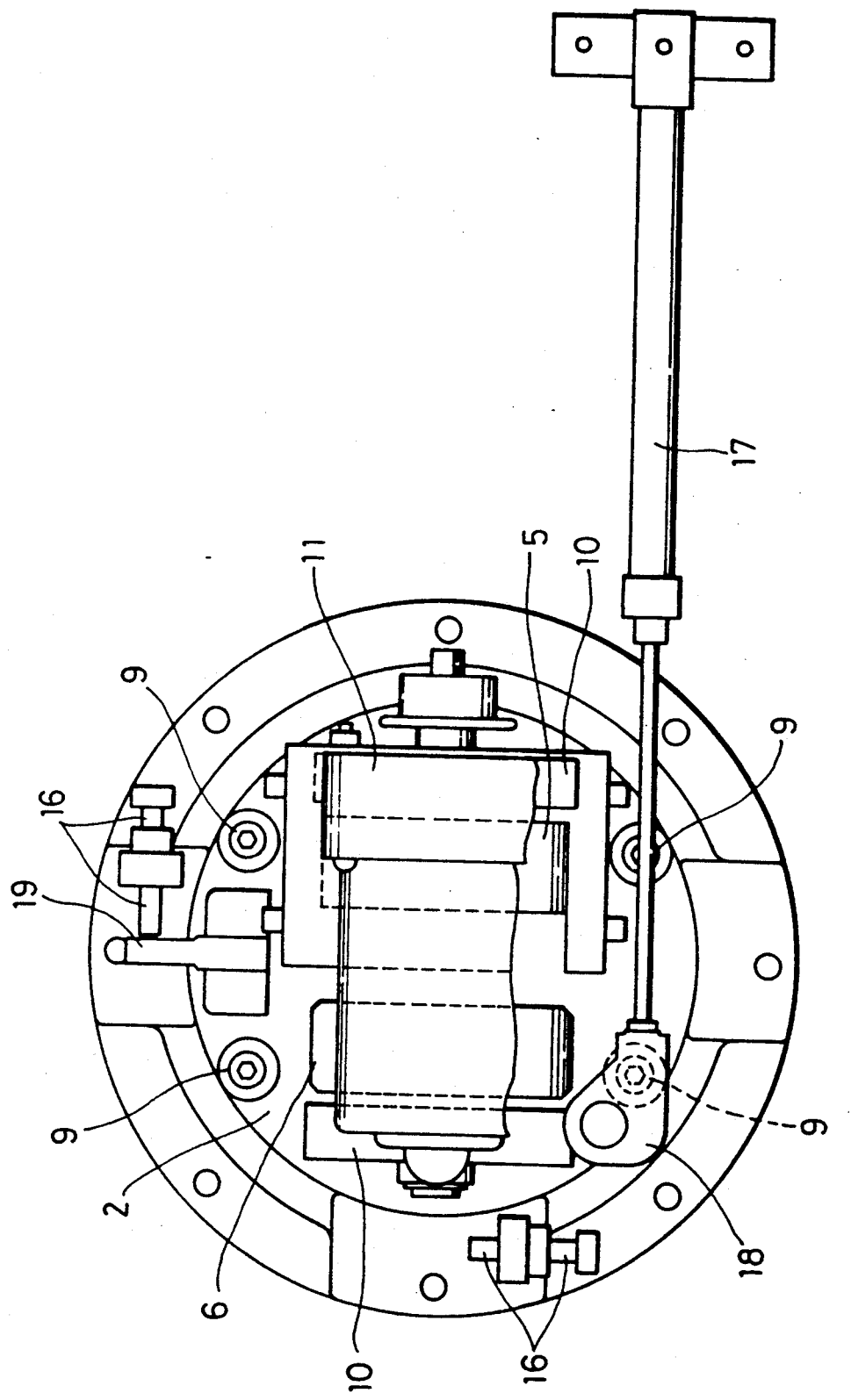
FIG. 2 is a plan view of the drive unit shown in FIG. 1.

As shown in FIG. 2, the rotary plate 2 is rotatably driven by an air cylinder 17 through a rotary joint 18, the air cylinder 17 being rotatably mounted, at the other end, on the body of the maintenance machine. The rotational angle in the rotary plate 2 is limited to a range of 90 degrees±alpha by cooperation of a stopper 19 on the rotary plate 2 with a stop bolt 16 on the machine body. The value ±alpha can be fine adjusted by rotating the stop bolt 16.

Figure 7:
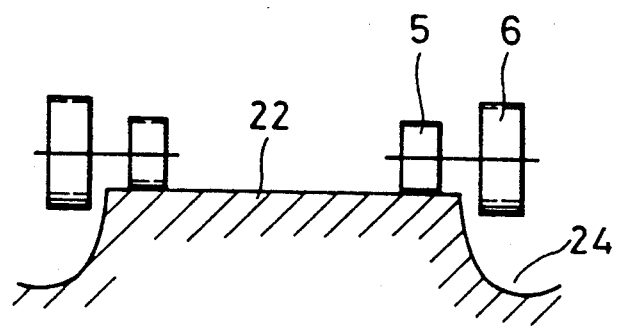
FIG. 7 is a schematic view illustrating a drive unit according to the present invention when running a bowling lane.
Figure 8:
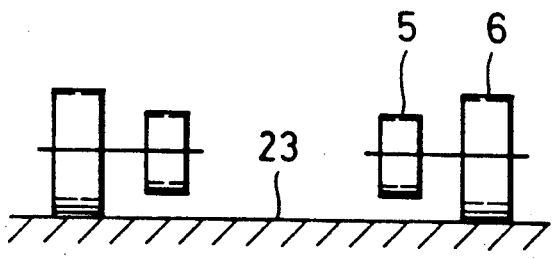
FIG. 8 is a schematic view illustrating the drive unit when riding on the approach.
Figure 9:
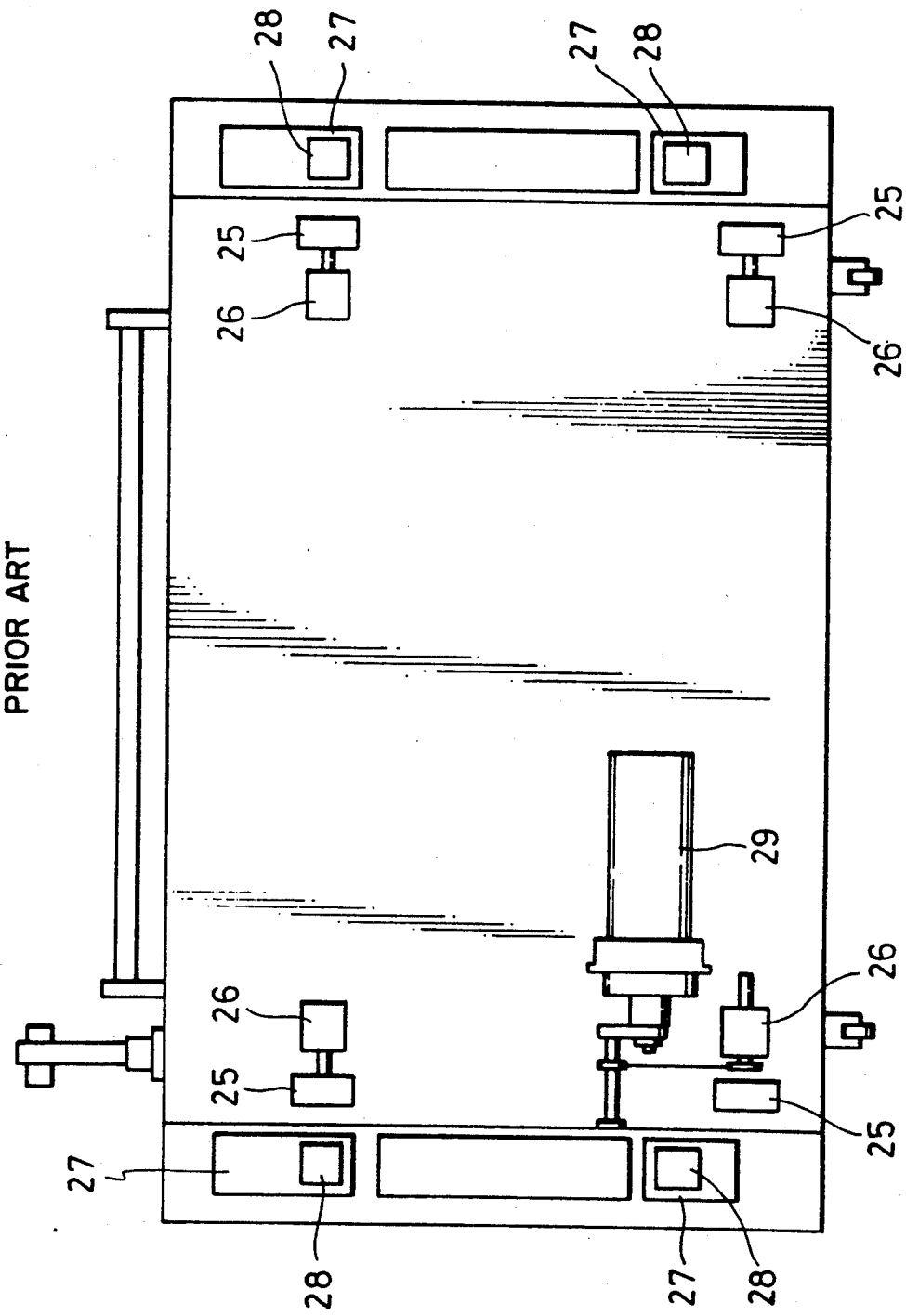
FIG. 9 is a schematic bottom view of one prior art bowling-lane maintenance machine.

As seen from FIGS. 1 and 2, the drive unit 1 further includes a drive motor 11 fixedly mounted thereon above the rotary plate 2 and a shaft 7 rotatably mounted on the rotary plate through two bearings 10. The shaft 7 supports a ride-on-approach and transverse running wheel 6 and a lane running wheel 5 which are fixedly connected with the shaft 7 through keys 8 for rotating therewith. The ride-on-approach and transverse running wheel 6 has a diameter larger than that of the lane running wheel 5. As seen from FIG. 7 and 8, therefore, the lane running wheel 5 will not be brought into contact with an approach 23 when the machine rides on the approach 23 and moves transversely on the approach 23.

Figure 3:
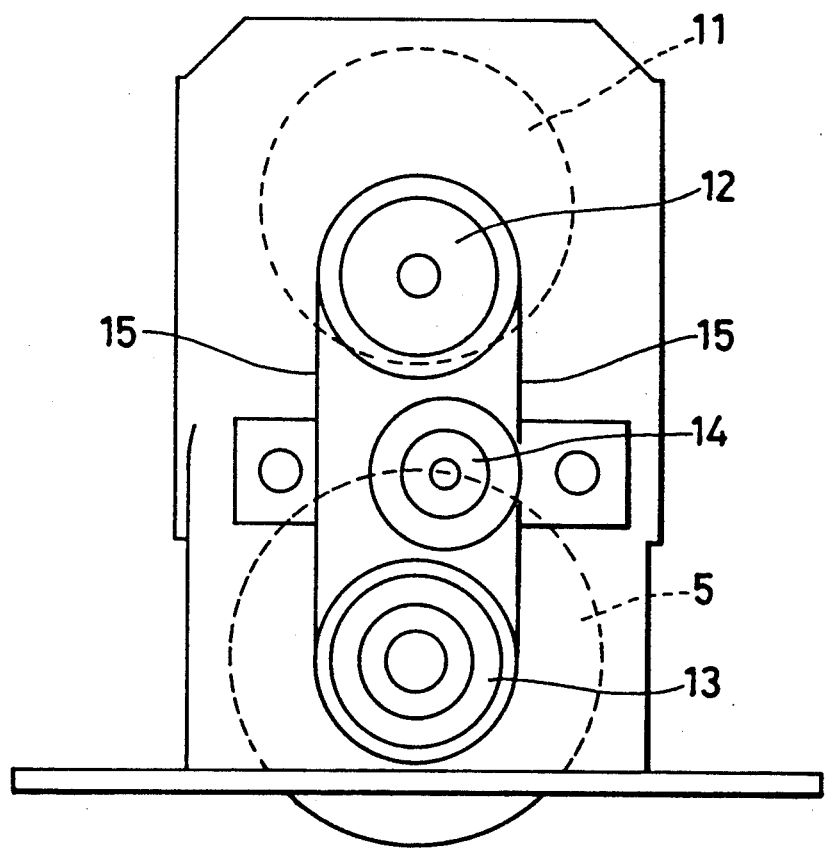
FIG. 3 is a side view of the drive unit as viewed rightward in FIG. 1.

As shown in FIG. 3, a driven sprocket 13 is fixedly connected with the shaft 7 at one end through a key. The driven sprocket 13 is drivingly connected with a drive sprocket 12 and a tensioning sprocket 14 through a chain or belt 15. The drive sprocket 12 is fixedly mounted on the drive motor 1 at one end. When the drive motor 1 is energized, its rotation is transmitted to the two wheels 5 and 6.

Figure 4:
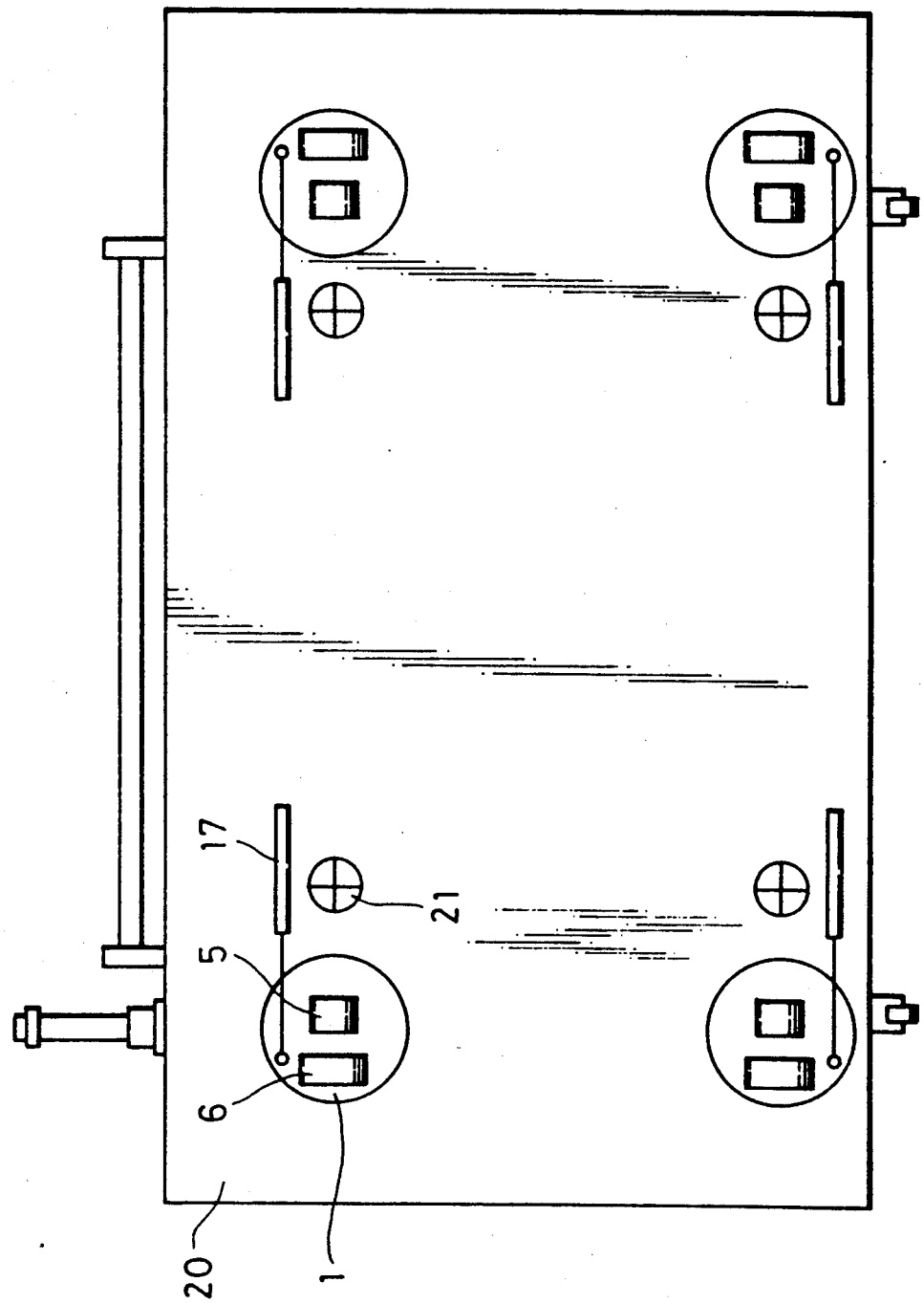
FIG. 4 is a bottom view of a bowling-lane maintenance machine on which four drive units of the present invention are mounted.

FIG. 4 shows four drive units 1 constructed according to the present invention, which are mounted on the body 20 of the bowling-lane maintenance machine at the respective positions adjacent to four corners on the body bottom. The machine body also includes four lift cylinders 21 mounted thereon at the bottom thereof.

Figure 5:
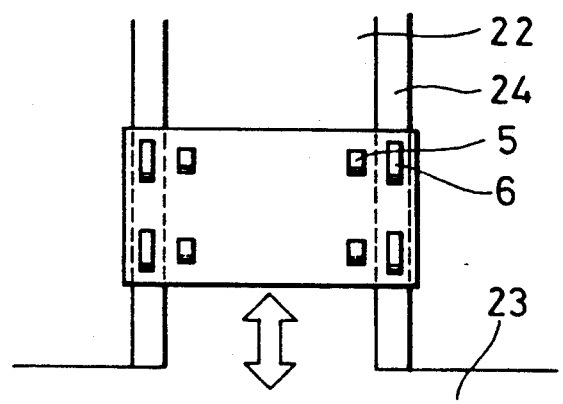
FIG. 5 is a schematic plan view of the bowling-lane maintenance machine when running along a bowling lane.
Figure 6:
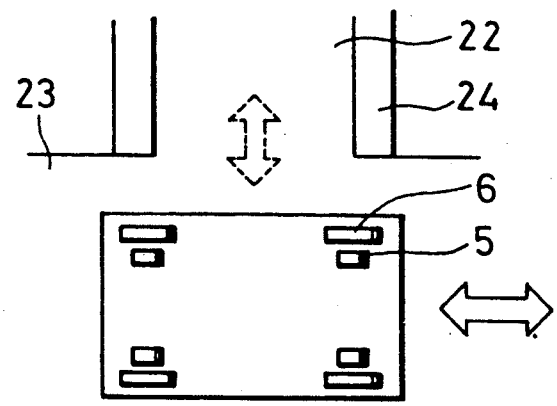
FIG. 6 is a schematic plan view of the bowling-lane maintenance machine when running on an approach in a direction substantially perpendicular to the bowling lane.

On operation, the bowling-lane maintenance machine is first propelled along a lane 22 by the eight rotating wheels 5 and 6 driven by the respective drive motors as shown by double-headed arrow in FIG. 5. After cleaning and oiling the lane 22, the machine is then moved onto the approach 23 by the ride-on-approach and transverse running wheels 6 which ride on the approach 23. When the machine is completely placed on the approaches 23, the four lift cylinders 21 are then actuated to move the machine upwardly. While the machine being shifted above the approach, the air cylinder in each of the drive units 1 is actuated to turn the drive unit 1 through the angel of 90 degrees±alpha, resulting in rotation of the corresponding pair of wheels 5 and 6 through 90 degrees±alpha. When the machine is to be moved transversely, that is, in a direction substantially perpendicular to the cleaned and oiled lane 22 on the approach 23, all the lift cylinders 21 are contracted to bring the ride-on-approach and transverse running wheels 6 into contact with the surface of the approach 23. Thus, the machine may be moved on the approach 23 in a direction as shown by double-headed arrow in FIG. 6.

If it si desired for the machine to enter the next lane, the lift cylinders 21 is again actuated to lift the machine and the wheels are turned in the desired direction.

If the four drive motors 1 are adjusted individually in revolution per minute, the machine may be easily turned during operation.

I claim:

1. A method of moving a bowling-lane maintenance machine, comprising the steps of providing a plurality of drive units on the body of the bowling-lane maintenance machine, each drive unit including a lane running first wheel on the body of the bowling-lane maintenance machine, providing a ride-on-approach and transversely running second wheel on the body of said bowling-lane maintenance machine and having a diameter larger than that of said lane running first wheel, providing a means for turning the second wheel on each drive unit, providing a means for determining the angle of turn and providing a means for driving the second wheels; lifting the bowling-lane maintenance machine by lifting means on said machine body; turning said drive units through an angle of substantially 90 degrees to change the machine in its direction of movement; fine adjusting the direction of movement of the maintenance machine by said turning means while maintaining said angle of turn in the range of substantially 90 degrees; and controlling the maintenance machine in its direction of movement by regulating the rotation of the respective drive means during the running of the machine.

2. An apparatus of moving a bowling-lane maintenance machine, comprising a plurality of drive units on the body of the bowling-lane maintenance machine, each drive unit including a lane running first wheel on the body of the bowling-lane maintenance machine, a ride-on-approach and transversely running second wheel on said maintenance machine and having a diameter larger than that of said lane running first wheel, means for turning the second wheels, angle determining means for maintaining the angle of turn within a range of substantially 90 degrees and means for driving the second wheels, and lifting means located on said maintenance machine and connected with said drive units.

* * * * *